(12) United States Patent
Lubowicki et al.

(10) Patent No.: US 7,021,199 B2
(45) Date of Patent: Apr. 4, 2006

(54) HOUSEHOLD ELECTRICAL APPLIANCE

(75) Inventors: Jean-Pierre Lubowicki, Aix-les-Bains (FR); Denis Gruaz, Villaz (FR)

(73) Assignee: Seb SA, Ecully (FR)

( * ) Notice: Subject to any disclaimer, the term of this patent is extended or adjusted under 35 U.S.C. 154(b) by 0 days.

(21) Appl. No.: 10/650,675

(22) Filed: Aug. 29, 2003

(65) Prior Publication Data

US 2005/0050682 A1    Mar. 10, 2005

(30) Foreign Application Priority Data

Jun. 26, 2003    (FR)    .................................. 03 07742

(51) Int. Cl.
*A47J 3/00*    (2006.01)

(52) U.S. Cl. ........................... 99/372; 99/424; 99/377; 16/266; 16/260

(58) Field of Classification Search ................. 16/266, 16/259, 260; 248/291.1, 292.12; 99/377, 99/349, 376, 424; 219/524
See application file for complete search history.

(56) References Cited

U.S. PATENT DOCUMENTS

| | | | | |
|---|---|---|---|---|
| 3,999,473 A | * | 12/1976 | Carbon .......................... | 99/377 |
| 4,075,940 A | * | 2/1978 | Carbon .......................... | 99/377 |
| 4,803,918 A | | 2/1989 | Carbon et al. | |
| 4,967,650 A | * | 11/1990 | Weigle .......................... | 99/374 |
| 5,636,564 A | * | 6/1997 | Weiss .......................... | 99/332 |
| 5,768,994 A | * | 6/1998 | Bobo .......................... | 99/374 |
| 5,937,742 A | | 8/1999 | Steeb et al. | |
| 6,167,796 B1 | * | 1/2001 | Wright et al. ................. | 99/332 |
| D465,965 S | * | 11/2002 | Dalton et al. ................ | D7/352 |
| D488,667 S | * | 4/2004 | Seum et al. ................. | D7/352 |
| D492,542 S | * | 7/2004 | Pitteurs ....................... | D7/388 |

FOREIGN PATENT DOCUMENTS

DE    010027736 A1    *    12/2001

* cited by examiner

*Primary Examiner*—Brian E. Glessner
*Assistant Examiner*—Mark Williams
(74) *Attorney, Agent, or Firm*—Young & Thompson

(57) ABSTRACT

The household electrical appliance comprises a support and a waffle-iron which pivots on the support about an axis and which has a pivot pivotally mounted on a bearing carried by the support. In the invention, the pivot is secured to a first panel of the waffle-iron and has a housing which is adapted, when the two panels are in the closed position, to receive a locking element secured to the other panel, and the bearing has an opening disposed so as to allow the locking element to pass freely for opening and closing the waffle-iron when it is in its working position, and to prevent the two panels from opening when it is in its upside-down position.

9 Claims, 2 Drawing Sheets

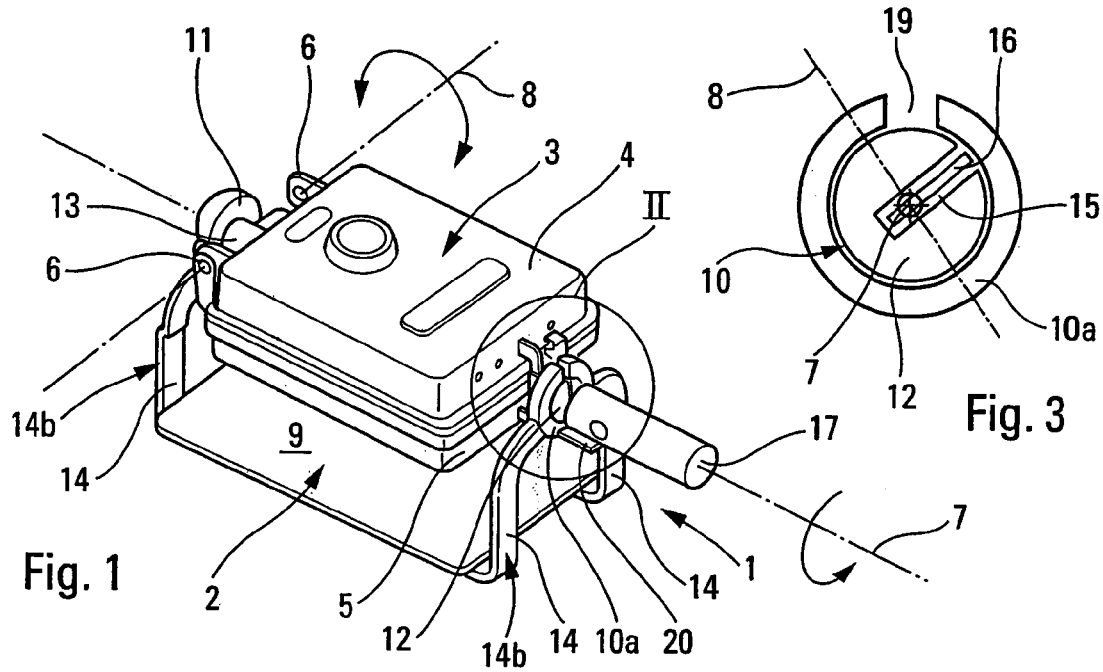
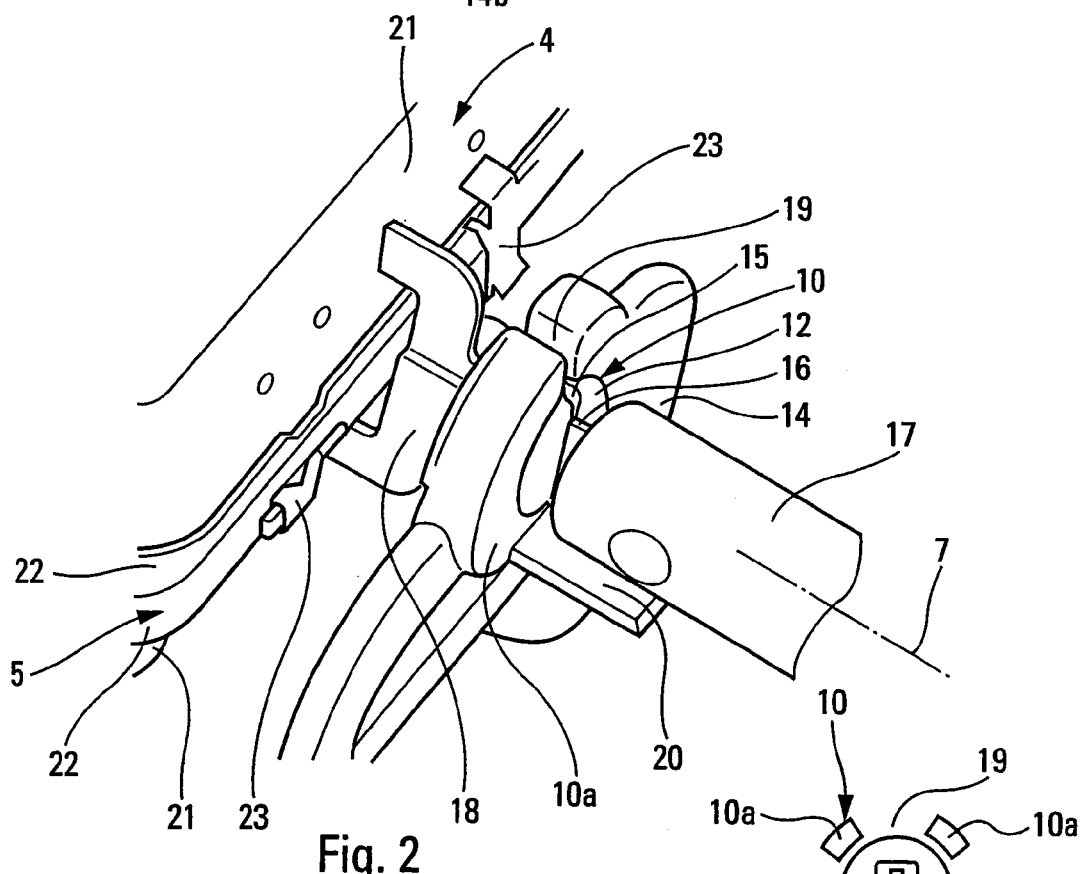

HOUSEHOLD ELECTRICAL APPLIANCE

The present invention relates to a household electrical appliance of the type comprising a support and a device of the waffle-iron type pivotally mounted on the support.

BACKGROUND OF THE INVENTION

A household electrical appliance is known of the type comprising firstly a support and secondly a waffle-iron device which comprises a top panel and a bottom panel hinged to each other by a hinge to move between an open position and a closed position, the device being pivotally mounted on the support about a pivot axis to move between at least a working angular position in which the axis of the hinge is oriented horizontally, the top panel being above the bottom panel, and an upside-down second angular position in which the axis of the hinge is oriented horizontally, the top panel being beneath the bottom panel.

Such an appliance is described in U.S. Pat. No. 2,116,688 in which the device further comprises a central panel so as to form a double waffle-iron, the top panel and the bottom panel each including a handle connected to the corresponding panel via a half-shaft extending along the pivot axis when the device is in the closed position, the two half-shafts forming a pivot shaft when the device is in the closed position.

Nevertheless, in such a household electrical appliance, it is difficult to spread the waffle batter uniformly in the waffle-iron: when the waffle-iron is full of waffle batter, swelling of the batter causes the panels to move apart, and thus the batter does not tend to spread uniformly over the surface of the panels, but instead swells with a large component in the panel-opening direction. It is plausible that in the appliance described in U.S. Pat. No. 2,116,688, the central panel does not move away from the panel placed beneath it (the bottom panel in the working position or the top panel in the upside-down position) because of the weight of the central panel and the weight of the panel which is situated above it, however, whether or not that is the case, there will always be movement apart between the central panel and the panel which is situated above it. Furthermore, in a device having only two panels, the weight of a single panel is insufficient to prevent the panels moving apart. This moving apart of the panels necessarily leads to batter being lost from the appliance and to waffles that swell little.

OBJECTS AND SUMMARY OF THE INVENTION

The problem posed is to make a household electrical appliance of the above-specified type that is simple in structure, and in which the conformation of the various component elements enables batter to spread uniformly between the panels in position.

The solution proposed by the present invention is an appliance of the above-specified type further comprising a releasable locking device acting on the relative movement between the top and bottom panels to allow the top panel to move freely relative to the bottom panel when the device is in its working position, and to lock the top panel in its closed position relative to the bottom panel when the device is in its upside-down position.

Thus, by means of this configuration, once the batter has been placed on the bottom panel, with the device being open in its working position, the top panel is lowered so as to close the device, and then the device is pivoted into its upside-down position in which it is locked in the closed position. In the invention, the locking of the two panels in the closed position when the device is in its upside-down position enables the batter to spread well.

In a particular embodiment, the locking device comprises a locking element secured to the top panel, a pivot secured to the bottom panel extending along the pivot axis opposite from the hinge, and having a housing adapted to receive the locking element when the two panels are in the closed position, and a bearing carried by the support, in which bearing the pivot is pivotally mounted, and including an opening which is disposed so as to allow the locking element to pass through to open and close the device when the device is in its working position, the bearing being shaped in such a manner as to prevent the panels opening when the device is in its upside-down position.

Thus, in this configuration, when the device in the working position is closed, the locking element is disposed in the housing after passing through the opening in the bearing, and when the device is pivoted, the pivot and the locking element pivot in the bearing. The pivot is held captive in the bearing given that it extends over more than half a turn, and as soon as the pivot and the locking element have pivoted through an angle that is sufficient for the locking element (disposed in the pivot housing) no longer to be fully in register with the opening of the bearing, the locking element is also held captive in the bearing. Thus, the two panels are locked together automatically as soon as the device is subjected to pivoting through a predetermined sufficient angle.

BRIEF DESCRIPTION OF THE DRAWINGS

Other advantages and features appear in the description of an embodiment which is shown in the accompanying drawings and which is given purely by way of non-limiting example.

FIG. 1 is a perspective view of a household electrical appliance in accordance with the present invention, the device being closed in the working position.

FIG. 2 is an enlargement of zone II in FIG. 1.

FIG. 3 is a simplified section view perpendicular to the pivot axis showing co-operation between the bearing, the pivot, and the locking element in a first embodiment of the present invention.

FIG. 4 is a view similar to FIG. 3 showing a second embodiment.

MORE DETAILED DESCRIPTION

Figure 5:
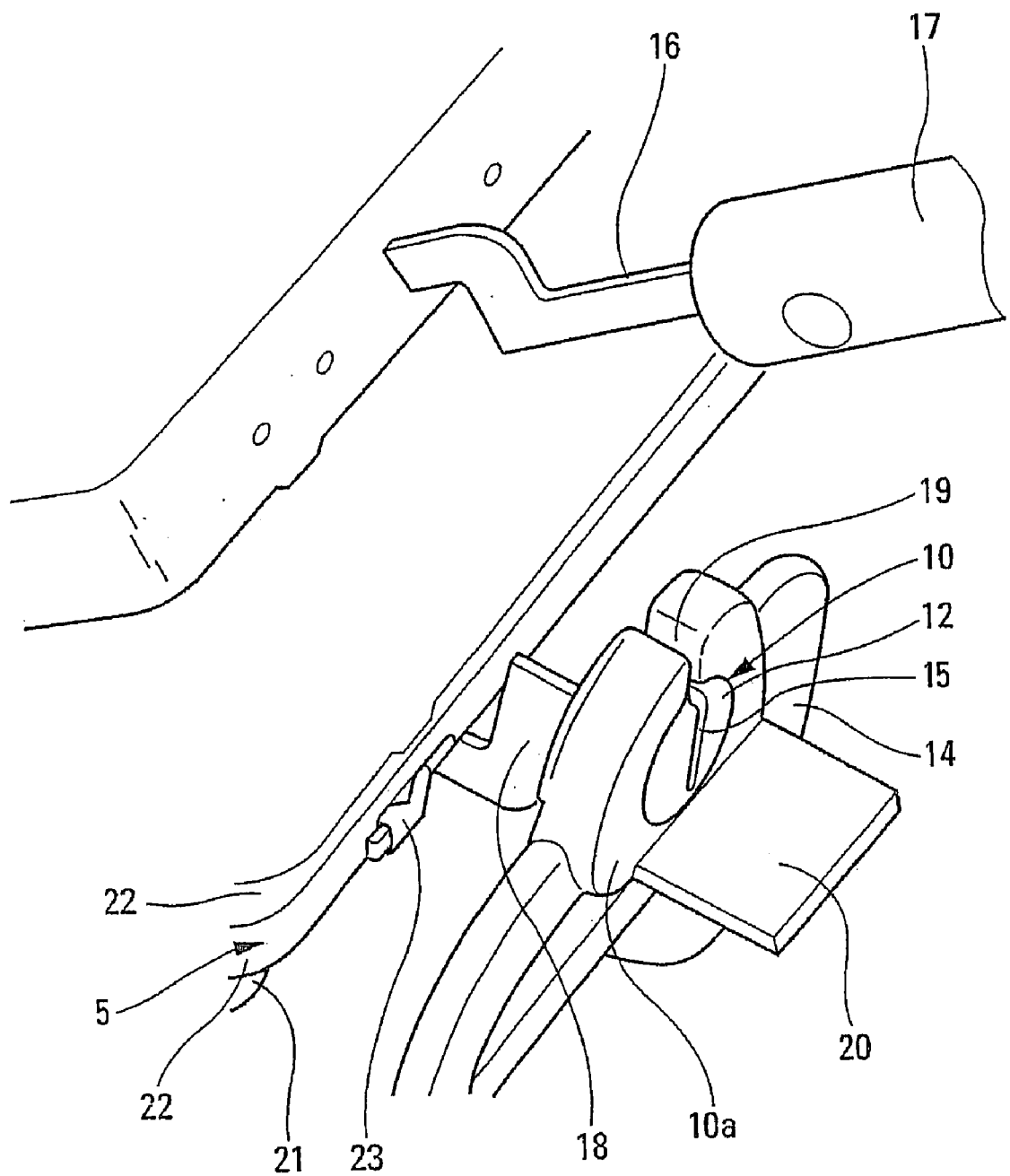
FIG. 5 is a view similar to FIG. 2 showing the device in an open position.

As can be seen in FIG. 1, a household electrical appliance 1 comprises a support 2 and a waffle-iron type device 3.

The waffle-iron 3 comprises two panels 4, 5 which are hinged to each other by a hinge 6 to move between an open position and a closed position. The waffle-iron 3 is pivotally mounted on the support about a pivot axis 7 to move between at least one working angular position in which the axis 8 of the hinge 6 extends horizontally and in which the top panel 4 is above the bottom panel 5 when they are in the closed position (FIGS. 1 and 2), and an upside-down second angular position in which the axis 8 of the hinge 6 is oriented horizontally, the top panel 4 being underneath the bottom panel 5 when they are in the closed position. The axis 8 of the hinge 6 is perpendicular to the pivot axis 7. Between the working position and the upside-down position there is an angular offset of half a turn.

In conventional manner, each panel 4, 5 comprises a shell 21 forming the body of the corresponding panel, a hot plate 22 which is carried by the corresponding shell and which is adapted to receive the food to be cooked, and an electrical resistance element which is for heating the hot plate 22. In the present example, each hot plate 22 is releasably connected to the corresponding shell 21 by a clip mechanism 23.

Advantageously, the support 2 has first and second stands 14a, 14b standing on a bottom plate 9 and on which the waffle-iron device 3 is pivotally mounted at two opposite ends.

Astutely, the waffle-iron device has a single handle 17 situated at the end of an arm (also referred to as a blade) 16 connected to the top panel 4 and extending from one only of its ends, remotely from the hinge 6 situated on the first stand 14a. The arm 16 extends towards the second stand 14b when the device is in the working position or in the upside-down position and rests against it in both of these two positions. Furthermore, the releasable locking device engages the arm 16 in said upside-down position and disengages it in the working position so as to then allow the top and bottom panels 4 and 5 to hinge freely about the hinge 6.

It should also be observed that the bottom panel 5 is connected to an arm (or blade) 18 extending along the first arm 16, both in the working position and in the upside-down position of the waffle-iron device, said arms 16, 18 bearing in both of these positions against the second stand 14b in a pivot zone 10.

The bottom plate 9 of the support 2 comprises or supports a drip tray which extends beneath the waffle-iron 3 for the purpose of receiving waffle batter that falls therefrom. The support 2 also has a front bearing 10a which is situated remote from the hinge 6, and a back bearing 11 which is situated beside the hinge 6, the two bearings 10a and 11 being in alignment on the pivot axis 7 and serving to support the waffle-iron 3. Naturally, the two bearings 10a, 11 are situated high enough above the drip tray 9 to allow the waffle-iron 3 to pivot freely about the pivot axis 7.

The waffle-iron 3 has a front pivot 12 which is situated remote from the hinge 6 and which is mounted to turn freely in the front bearing 10a, and a back pivot 13 which is situated beside the hinge 6 and which is free to turn in the back bearing 11. Thus, the two pivots 12 and 13 extend along the pivot axis 7 and form the pivot shaft about which the waffle-iron 3 pivots.

The back pivot 13 is a cylinder held captive in the back bearing 11 formed by a ring secured to the drip tray by two arms which together form the first vertical stand 14a. As a result, the only degree of freedom in movement of the back pivot 13 in the back bearing 11 is in rotation about the pivot axis 7.

The front pivot 12 is secured to the bottom panel 5 and has a housing 17 which is adapted to receive a locking element 16 when the two panels 4 and 5 are in the closed position, which locking element 16 is secured to the top panel 4. When the two panels 4 and 5 are in the open position (FIG. 5), the locking element 16 is outside the housing 15, and when the two panels 4, 5 are in the closed position, the locking element 16 is situated in the housing 15.

The front bearing 10a has an opening 19 disposed in such a manner as to allow the locking element 16 to pass through for opening and closing the waffle-iron 3 when the waffle-iron 3 is in its working position. The opening 19 extends over less than half a turn so as to hold the front pivot 12 captive and prevent the panels 4 and 5 from opening when the waffle-iron 3 is in its upside-down position.

Thus, the locking device has a bearing 10a arranged on said support 2 for receiving the arm 18 of the bottom panel 5, said bearing pivotally supporting the pivot 12 whose slot 15 receives a portion (16) of said single handle 17.

It will be understood that when the waffle-iron 3 is in its working position, while the top panel 4 is being moved relative to the bottom panel 5, the locking element 16 passes freely through the front opening 19 prior to being received in the housing 15 (in the closing direction) or after leaving the housing 15 (in the opening direction). It will also be understood that as soon as the front pivot 12 has pivoted about the pivot axis 7 through an angle such that the locking element 16 is no longer fully in register with the opening 19, it can no longer leave the housing 15, and as a result the waffle-iron 3 is locked in its closed position, and in particular when the waffle-iron 3 is in its upside-down position, the locking element 16 comes into abutment against the bottom portion of the inside wall of the front bearing 10, thereby preventing the waffle-iron 3 from being opened.

Furthermore, it should also be understood that in order to avoid there being any clearance between the two panels 4, 5 when the waffle-iron 3 is closed, it is preferable for the height of the locking element 16 to be such that, when it is in abutment in the housing 15, it is also in abutment against the inside surface of the front bearing 10 (ignoring the clearance that is necessary to enable the front pivot 12 to pivot in the front bearing 10).

In the present example, the locking element 16 is formed by a blade 16 which extends perpendicularly to the axis 8 of the hinge 6 and along the pivot axis 7, and which connects the top panel 4 to a handle 17. In the present embodiment, the waffle-iron has only one handle 17 which is used both to pivot the waffle-iron 3 about the pivot axis 7 and to open and close the top panel 4.

In the present embodiment, the front pivot 12 is connected to the bottom panel 5 by a connection blade 18 which extends perpendicularly to the axis 8 of the hinge 6 along the pivot axis 7. The connection blade 18 is slightly offset in the direction defined by the axis 8 of the hinge 6 relative to the blade 16 forming the locking element 16, thereby enabling the two panels 4, 5 to be closed.

The general shape of the front pivot 12 is that of a cylinder, and the housing 15 is formed by a slot 15 which passes through the center of the pivot 12. The slot 15 extends along the pivot axis 7 and when the waffle-iron 3 is in its working position, the slot extends vertically. The dimensions of the slot 15 (widthwise, i.e. in the direction of the axis 8 of the hinge 6, and heightwise, i.e. vertically when the waffle-iron 3 is in its working position) corresponding to the dimensions of the blade 16 (i.e. respectively to its width and to its height).

In the present embodiment, the front bearing 10a is formed by a ring which is secured to the drip tray by two arms 14 (possibly forming the second stand 14b) and including a groove 19 forming the opening 19. The groove 19 extends vertically and along the pivot axis 7, and extends the housing 15 when the waffle-iron 3 is in its working position. The width of the groove 19 is slightly greater than the width of the slot 15, and as a result it suffices to pivot the waffle-iron only slightly in order to lock it in the closed position. The inside diameter of the ring 10 corresponds to the outside diameter of the front pivot 12 (ignoring the clearance that is necessary to allow rotation).

Thus, the household electrical appliance 1 comprises: the support 2; the bottom panel 5, which is pivotally mounted relative to the support 2 about the pivot axis 7 and which is held captive relative to the support 2; and the top panel 4, which is mounted to turn relative to the bottom panel 5 (when the locking device is in a configuration that allows the device 3 to be opened) about the axis 8 of the hinge, and which is mounted to pivot relative to the support 2 about the pivot axis 7 (in particular when the device 3 is closed).

In addition, in order to assist in closing the waffle-iron 3, the front bearing 10*a* has a clamping tongue 20 which projects from the front bearing 10 along the pivot axis 7 away from the waffle-iron 3 and which is disposed beneath the front pivot 12. The clamping tongue 20 is used to bring the locking element 16 fully into the housing 15 which can be advantageous when a large amount of waffle batter has been placed between the panels 4, 5 or when the device 3 is being used to grill Welsh rabbit (Welsh rabbit is always made thicker than the cavity between the corresponding hot plates 22, since cooking is better when the Welsh rabbit is clamped by the hot plate 22).

As can be seen in FIG. 4, the bearing 10*a* may extend over less than half a turn, the essential point being that it is shaped in such a manner that the pivot 12 is held captive therein and the locking element 16 comes into abutment against its inside surface when the device 3 is in its upside-down position.

Naturally, the present invention is not limited to the embodiment described above, it being possible, for example, to have a device with a central panel, the pivot and the locking element each being carried by an outer panel.

What is claimed is:

1. A household electrical appliance comprising a support and a waffle-iron which comprises:
    a top panel and a bottom panel hinged to each other by a hinge to move between an open position and a closed position, the waffle-iron being pivotally mounted on the support about a pivot axis to move between at least a working angular position in which an axis of the hinge is oriented horizontally, the top panel being above the bottom panel, and an upside-down angular position in which the axis of the hinge is oriented horizontally, the top panel being beneath the bottom panel,
    the appliance further comprising a releasable locking device acting on the relative movement between the top and bottom panels to allow the top panel to move freely relative to the bottom panel when the device is in its working angular position, and to lock the top panel in its closed position relative to the bottom panel when the device is in its upside-down angular position,
    wherein the locking device comprises a locking element secured to the top panel, a pivot secured to the bottom panel extending along the pivot axis remotely from the hinge, a housing adapted to receive the locking element when the two panels are in the closed position, and a bearing carried by the support in which the pivot is pivotally mounted, said bearing being shaped as to prevent the panels from opening when the waffle-iron is in the upside-down angular position and including an opening which is disposed as to allow the locking element to pass in order to allow the waffle-iron to open and close when the waffle-iron is in its working angular position, and
    wherein the bearing has a clamping tongue projecting from the bearing along the pivot axis away from the device, and disposed beneath the pivot.

2. A household electrical appliance comprising a support and a waffle-iron which comprises a top panel and a bottom panel hinged to each other by a hinge to move about a hinge axis between an open position and a closed position,
    the waffle-iron being pivotally mounted on the support about a pivot axis to move between at least a working angular position in which the hinge axis is oriented horizontally and said top panel is above said bottom panel, and an upside-down angular position in which the hinge axis is oriented horizontally and said top panel is beneath said bottom panel,
    the appliance further comprising a releasable lock acting on the relative movement between said top and bottom panels to allow said top panel to move freely relative to said bottom panel when the waffle-iron is in its working angular position, and to lock said top panel in its closed position relative to said bottom panel when the waffle-iron is in its upside-down angular position,
    said support carrying a bearing delimiting an internal cylindrical hole that has an inner diameter and extends along the pivot axis, said bearing having on its upper half an opening leading to said cylindrical hole, said opening having in the horizontal direction a dimension smaller that that of the inner diameter of said cylindrical hole,
    said bottom panel carrying a cylindrical pivot extending along the pivot axis remotely from said hinge, said cylindrical pivot having an outer diameter substantially equal to the inner diameter of said cylindrical hole in order to be pivotally mounted in said cylindrical hole and to be held captive therein,
    said cylindrical pivot including a housing that has in the hinge axis direction a dimension substantially equal to or smaller than the horizontal dimension of said opening in order to extend said opening when the waffle-iron is in its working angular position, and
    said top panel carrying a locking element extending remotely from said hinge along a longitudinal direction that corresponds to the pivot axis direction when said top panel is in its closed position, said locking element having in the hinge axis direction a dimension substantially equal to that of said housing in order to pass through said opening when the waffle-iron is in its working angular position and said top panel is moved relatively to said bottom panel, and, in order to be received by said housing when said top panel is in its closed position, said locking element having in a transverse direction that is perpendicular to both the longitudinal direction and the hinge axis direction a dimension substantially equal to the dimension of said housing in an opening direction that is perpendicular to both the pivot axis direction and the hinge axis direction in order to prevent said top panel from opening when the waffle-iron is in its upside-down angular position.

3. The household electrical appliance according to claim 2, wherein the locking element is a blade extending along the pivot axis.

4. The household electrical appliance according to claim 2, wherein the housing is a slot limited by a bottom wall extending along a plane normal to the opening direction and two side walls extending along a plane normal to the hinge axis direction.

5. The household electrical appliance according to claim 2, wherein the bearing has a clamping tongue projecting from the bearing along the pivot axis away from the device and disposed beneath the hole.

6. The household electrical appliance according to claim 2, wherein the pivot is connected to the bottom panel by a connection blade extending along the pivot axis.

7. The household electrical appliance according to claim 2, wherein the device has a single handle that is connected to said top panel by said locking element.

8. The household electrical appliance according to claim 2, wherein the device has a second pivot beside the hinge and that is held captive and pivotally mounted in a second bearing secured to the support.

9. The household appliance according to claim 2, wherein said releasable lock comprises said bearing, said cylindrical pivot that is pivotally mounted in said cylindrical hole and held captive therein, and said locking element that is able to pass through said opening when the waffle-iron is in its working angular position and said top panel is moved relatively to said bottom panel, is received by said housing when said top panel is in its closed position, and is held captive in said housing when said top panel is in its closed position and said waffle-iron is in its upside-down angular position.

* * * * *